United States Patent Office 3,556,850
Patented Jan. 19, 1971

3,556,850
LEAD-ACID, POLYELECTROLYTE COMPLEX CONTAINING STORAGE BATTERY AND METHOD OF STORING AND HANDLING THE SAME
David L. Douglas and Henry J. Banas, Minneapolis, Minn., assignors to Gould-National Batteries, Inc., St. Paul, Minn., a corporation of Delaware
No Drawing. Filed Sept. 26, 1966, Ser. No. 581,749
Int. Cl. H01m 39/00, 39/04
U.S. Cl. 136—26
18 Claims

ABSTRACT OF THE DISCLOSURE

A water-activatable dry-charged lead-acid secondary cell, having a lead peroxide positive electrode, a sponge metallic lead negative electrode, and a cell container, is provided with a polyelectrolyte complex of ionically bonded polycationic and polyanionic organic resins within the cell. The complex contains sulfuric acid in an amount sufficient to provide a sulfuric acid electrolyte upon the addition of water to the cell to thereby activate the cell.

---

This invention relates to secondary cells, or storage batteries, of the lead-acid type. More particularly, the invention concerns a dry charged lead-acid secondary cell activated by the addition of water.

Lead-acid storage batteries are the most widely used of the secondary or storage cells. These batteries, having positive electrodes of lead peroxide, negative electrodes of sponge metallic lead, and as an electrolyte an aqueous solution of sulfuric acid, are employed extensively for automotive starting, emergency industrial power, submarine power, and like applications.

Lead-acid storage batteries are customarily stored before installation and use in either the "wet charged" or the "dry charge" condition. Wet charged batteries are those which have the sulfuric acid electrolyte in the cell compartments and thus in contact with the plates, while dry charged batteries are supplied, as the term suggests, with dry but active plates and with a separate container of sulfuric acid. In the latter case the user activates the battery by adding the sulfuric acid.

Although both wet and dry charged batteries are in widespread use, each has well recognized limitations. Wet charged batteries lose capacity during standing—as much as 1% per day—and consequently must either be kept on trickle charge or else periodically recharged. Further, the loss of capacity and the attendant necessary recharges are accompanied by grid corrosion and sulfation within the cell, and may limit the life of the battery when it is placed in service. On the other hand, while dry charged batteries do not need recharging and do not suffer from these effects, they require the inconvenience of storing and handling sulfuric acid.

Ideally, it would be desired to have a lead-acid storage battery that could be activated merely by adding water. If this could be achieved, the battery would avoid the requirement of periodically recharging a wet charged battery and would eliminate the need for separate acid storage as in the dry charged battery.

Attempts have previously been made to provide water activated, dry charged, lead-acid storage batteries. These generally employ a solid complex of sulfuric acid with various salts, and evolve sulfuric acid when water is added. The patent literature contains many other ingenious proposals. Nonetheless, despite strong and persistent demand, none has become commercial.

It has now been discovered, according to the invention, that a substantial advance towards the goal of a water activated dry charged lead-acid storage battery is achieved by including, within the battery cells and in communication with the dry charged battery plates, certain polyelectrolyte complexes of polycationic and polyanionic organic resins, which have a unique capability of absorbing sulfuric acid and of releasing the acid readily upon the addition of water. Thus, in accordance with the invention, a lead-acid storage battery, or secondary cell, is provided which has conventional dry-charged plates together with a sulfuric acid-containing polyelectrolyte complex; the battery is thus storable in the absence of water and without periodic or trickle recharging, and is activated merely by the addition of water.

The polyelectrolyte complexes with which the present invention is concerned have been described by others (e.g., Fuoss, R. M., Sadek, H., Science 110, 552 (1949); Michaels, Alan S., "Polyelectrolyte Complexes," Ind. and Eng. Chem., 57, No. 10, 32–40 (Ocotber 1965)). These polyelectrolyte complexes, which are more fully described below, are essentially ionically bonded networks composed of two organic resins, one having anionic groups (the polyanion) and the other cationic groups (the polycation). When properly formulated, the individual resins apparently react ionically to form a polymeric network that has, among other unusual properties, the ability to reversibly imbibe or absorb large amounts of sulfuric acid. Indeed, mixtures of 49 parts sulfuric acid and one part of certain polyelectrolytes have been prepared. Thus, in accordance with one aspect of the invention, the polyelectrolyte is loaded with sulfuric acid at a concentration in excess of that desired for an electrolyte, and sufficient acid-loaded polyelectrolyte is provided to afford an electrolyte of the desired or predetermined acid concentration upon the addition of a predetermined amount of water to the cell.

The advantages of the present invention are substantial. Sulfuric acid electrolyte, lead-acid storage batteries may be assembled which are activated only by adding water, and yet which have electrical performance characteristics comparable to present wet charged or dry charged batteries. At the same time, they need not be recharged or trickle charged during storage, and there is no need to ship and handle a separate container of sulfuric acid. Further, the batteries or cells have high overall electrochemical efficiency, and retain this efficiency over many cycles of discharge and charge.

The polyelectrolyte complexes themselves are readily formed into shapes such as those commonly used as battery plate separators. They are inert to both the positive and negative plate materials, and neither the polyelectrolytes nor the plate materials are adversely affected by the presence of either. This stability apparently is retained over the normal operating temperature range of lead-acid storage batteries.

When employed as the separator or as a constituent of the separator between the battery plates, polyelectrolytes contribute significant additional advantages. Electrically, they possess high ionic conductivity and thus minimize $I^2R$ losses on both charge and discharge. In point of fact, their conductivity is nearly that of the corresponding concentration of sulfuric acid alone. Additionally, the complex serves as an excellent separator. From the standpoint of preventing both physical contact between plates and of minimizing short circuiting through lead dendrite formation, polyelectrolyte separators appear to be at least as effective as available commercial separators. Their resilience and flexibility is of advantage in cushioning the plates against mechanical shock and vibration as well as in providing a compressable medium for retaining lead peroxide and sulfate on the plates. It is also believed that the polyelectrolytes may assist in preventing self-discharge of charged industrial storage batteries by preventing antimony migration (i.e., dissolution of antimony from the plate grids and plating onto the negative plates).

MANUFACTURE OF POLYELECTROLYTE COMPLEXES

As stated earlier, the sulfuric acid that is liberated by the addition of water to form the effective electrolyte is retained in a so-called polyelectrolyte complex. These complexes are formed by intimately combining one resin having anionic groups (the polyanion) and another having cationic groups (the polycation). Through ionic interaction, the two resins form an inseparable complex or "polysalt" that tends to precipitate as a complex of almost exactly stoichiometric proportions of the component polyion resins. Although techniques are available for preparing complexes in any proportion of polycation to polyanion, the composition of the true polysalt is apparently independent of the relative proportions in which the component polymers are mixed or of the order or rate of addition.

A wide variety of polyelectrolyte complexes has been made, although those of maximum present interest are those formed by interaction between a strongly acidic polyanion such as those containing sulfonate groups, and strongly basic polycations such as those having quaternary ammonium groups.

According to the preferred manner of carrying out the manufacture of polyelectrolyte complexes, polymers of sodium styrene sulfonate and of vinyl benzyl trimethyl ammonium chloride are prepared, each polymer having a synthetic organic polymeric structure which, without the ionic groups (sulfonate or quaternary ammonium) would be a water insoluble film forming material. The polymers or resins are accordingly characterized by a sufficiently high molecular weight to be solid (typically greater than 50,000) while having sufficient dissociable ionic groups chemically bonded to the polymeric structure to be water soluble. Conveniently, there should be at least one ionic group for every six repeating monomer (mer) units, or for each average chain interval of 12 carbon atoms.

In addition to the preferred polymers of sodium styrene sulfonate and vinyl benzyl trimethyl ammonium chloride, copolymers of these materials with other vinyl compounds may be employed, as well as other well-known polyelectrolytes of the same general type, such as polyacrylic acid, hydrolyzed copolymers of styrene and maleic anhydride, polyvinyl sulfonic acid, sulfonated polystyrene, sulfonated polyvinyl toluene, alkali metal salts of the foregoing acid polymers, polyethyleneimine, polyvinyl pyridine, and polydimethylaminoethyl methacrylate, quaternized polyethyleneimine, quaternized poly (dimethylaminoethyl) methacrylate, polyvinyl methyl pyridinium chloride, and the like. Polyanions containing sulfonate groups, and polycations containing quaternary ammonium groups, are at present preferred.

When solutions of oppositely charged polyelectrolytes are mixed together under proper conditions of concentration and temperature, the oppositely charged polyanions co-react ionically and precipitate from solution. Because of their high charge density, polyelectrolytes have a much greater tendency to associate with each other than do their corresponding monomers. Most polyelectrolyte precipitates can be dissolved, or their formation prevented, by the addition of sufficient amounts of "indifferent" soluble ionic salts such as magnesium sulfate or sodium chloride. Subsequent removal or dilution of these shielding salts results in reprecipitation of the polyelectrolyte complexes.

In forming the polyelectrolytes, an intimate, solvated mixture of the oppositely charged polyelectrolytes to be used (together with any desired additional fillers, plasticizing agents, etc.) is formed in a suitable solvent (usually aqueous) or solvent mixture by the addition of sufficient ionic salts, acids, and/or bases to prevent ionic interaction between the polyions. The mixture may be heated, and/or a suitable amount of a low polarity miscible liquid may be added to reduce the amount of ionic material required to prevent inter-polymer reaction. In general, the concentration of each polyion should be at least 0.5% by weight, preferably above 1.0% by weight of the mixture in order to obtain continuous solids in the subsequent processing.

The salts, acids and/or bases should be present in the solution in an amount of at least 10% by weight of the total solution, preferably at least 20% by weight. Although amounts as great as 50% or more by weight of the total solution may be used, it is unnecessary and frequently undesirable to employ any more than the minimum required to prevent precipitation of the polyions. Among the salts, acids, and bases which may be employed are those which are soluble in water to the extent of at least 10% by weight at room temperature, which are highly ionized in aqueous solution (pK less than 2.0), and which contain no ions which interreact with the polyelectrolyte to precipitate them. Such salts include the alkali metal and the alkaline earth metal salts, the tetramethylammonium salts, and the alkyl pyridinium salts in which the alkyl group has from 1 to 3 carbon atoms; the anion portion may include the chlorides, bromides, nitrates and sulfates. Useful acids include hydrochloric, hydrobromic, nitric, sulfuric, fluoroboric, chromic, perchloric, perbromic, periodic, mono-, di-, and tri-chloroacetic, trifluoroacetic, alkyl sulfonic (containing up to 20 carbon atoms in the alkyl group), and alkyl benzene sulfonic (of similar carbon length). Bases which may be used include hydroxides of alkali metals, barium, tetramethyl ammonium, alkyl pyridinium, etc. The low polarity liquid is preferably an organic solvent having a volatility approximately as great as that of water or even greater. Suitable solvent liquids include acetone, dioxane, methanol, ethanol, isopropanol, t-butyl alcohol, pyridine, morpholine, tetrahydrofuran, N-methyl pyrrolidone, and 2-methoxy ethanol. The solvent, when present, may be used in amounts up to 40% by weight of the total solution. In several of the examples described below the solvent was ethanol, although it is now believed that methanol would be preferable as being less likely to form acetic acid which has a known destructive effect on metallic lead.

The solution thus prepared is an intimate admixture of the two polyions, and may be gelled to form a polyelectrolyte complex having any desired ratio of polycation to polyanion. Thus, although stoichiometric ratios have mainly been used, it is possible to employ a preponderance of either the polycation or the polyanion, e.g., a ratio of about 10:1 to 1:10 or more preferably 1.5:1 to 1:1.5, if desired for particular purposes.

The solution of both polyions is then caused to gel by changing conditions so as to permit at least marginal interaction to occur between the electrolytes. The following methods for causing initial gellation may be used:

(a) By reducing the concentration of the shielding ionic species. This may be accomplished by diluting the solution, by evaporating a volatile electrolyte, or by contacting the solution with a solvent to extract the microions. Rapid surface gellation prevents the loss of polymer into the extracting solution but permits water soluble impurities such as salts, etc., to be removed.

(b) By cooling a mixture which contains only enough salts, acid, and/or base to prevent interpolymer reaction at elevated temperatures.

(c) By evaporation of a liquid component from a mixture to which a volatile, low polarity liquid (e.g., acetone) has been added to reduce the amount of salt required to shield the polyion.

(d) By neutralization of shielding acids or bases. Polyelectrolytes whose ionic functions are carboxyl or amine groups are usually more easily shielded by strong acids or bases than by ordinary salts. Raising the pH in an acid shielded system, or lowering the pH in a base-shielded system, will result in gelation provided the amount of salt produced in the neutralization reaction is insufficient to prevent polymer reaction.

The polyelectrolytes used in the examples below were prepared from poly (sodium styrene sulfonate), NaSS, an anionic polyelectrolyte having an average molecular weight of about 760,000 in Examples 1–5 and about 3,000,000 in Examples 6 and 7, and poly (vinyl benzyl trimethyl ammonium chloride), VBTAC, a cationic polyelectrolyte having an average molecular weight of about 300,000. Initially, each polyion is optionally first purified by treating an aqueous solution containing 3–5 weight percent of the respective polyion in a water solution with a mixture of a conventional cation exchange resin in the hydrogen form and with an anionic exchange resin in the hydroxide form with agitation for about 12 hours, and the respective solutions then filtered. The anionic polyion solution is then passed over a cation exchange resin in the sodium form while the other passed over an anionic resin in the chloride form to assure that the desired counter-ions are present. The solutions are then dried.

Appropriate amounts of each polyion are then dissolved in a solvent consisting of water, sodium bromide (or other salt or acid), and an organic material such as acetone or dioxane to provide about 5–10 percent by weight of each polyion. This solution is extruded into a large volume of water, whereupon the diluting effect of water reduces the concentration of the shielding sodium bromide and acetone and causes the polyelectrolyte to precipitate as light-colored strands composed of about 94% by weight of water. These strands are filtered, washed with water to remove adherent salts, and dried.

In one form of preparation, the dried strands are ground to a fine powder and re-dissolved in an aqueous solution of aqueous ethanol; as stated earlier, it is presently believed that methanol is preferable. (In an alternative form, the ethanol is omitted and instead the resin is merely stirred with appropriate quantities of acid, e.g., 1–10 parts by weight of 50–100% sulfuric acid per part of resin.)

Concentrated sulfuric acid is added in a predetermined amount sufficient to afford the desired ratio of sulfuric acid to polyelectrolyte resin; the ratio may be as little as one part by weight of acid to one of resin (or less), to as much as 10 parts per part (or more), but is preferably within the range of about 3:1–8:1. This results in the formation of an amber viscous mass, which is formed into a sheet and dried in a vacuum oven at 80° C. for three hours to remove water and ethanol. The dried acid-loaded membranes are flexible and self-supporting, and may be placed between polyethylene terephthalate sheets and stored in hermetically sealed polyethylene bags for physical protection and to exclude moisture.

When employing the polyelectrolyte resin in a porous inert (with respect to the resin, the acid, and the plate materials) matrix, the solution or dispersion of polyelectrolyte, aqueous methanol or ethanol, and sulfuric acid is impregnated into the porous material, and the impregnated material thereafter dried under vacuum at 80° C. for three hours.

Such inert porous materials as non-woven polyvinyl chloride felt, wool felt, polyethylene, or polypropylene are suitable as foraminous materials that act as supporting matrices for the sulfuric acid-containing polyelectrolyte. The relative proportion of polyelectrolytes to porous material may vary widely, but is usually within the range of about 1:4 to 4:1 on a dry basis.

The polyelectrolyte and associated acid together with any porous material may if desired be used as the separator for a water activated dry charged lead-acid storage battery. Under some circumstances it may be advantageous to employ a ribbed configuration in the acid-loaded polyelectrolyte material or to add an auxiliary foraminous or ribbed separator in order to prevent direct contact between acid-loaded polyelectrolyte and cell plate material. This will minimize self-discharge before activation and upon activation, the ribs will allow electrolyte circulation along the plates.

MANUFACTURE OF PLATES

The dry charged positive and negative plates for use herewith may be manufactured by any of the techniques heretofore commonly used for sulfuric acid activated dry charged batteries. In any event, the plates are composed of an electrically conductive porous grid having its interstices filled with active material—lead peroxide in the positive plates and sponge lead in the negative plates.

The grids for both positive and negative plates are advantageously die cast from a lead alloy typically containing about 7% antimony, 0.25% tin, and 0.1% arsenic. Grid dimensions depend on battery size and the expected use of the battery; in automobile batteries the grid thickness may vary from less than 0.05" for high-capacity batteries, up to about 0.25" for longer-lived ones. Since there is normally one more negative plate than positive plate per cell, the negative grids are usually thinner than the positive ones, but the total weight of negative active material is approximately equal to the total weight of positive active material.

As is well known, lead-acid storage batteries produce electricity by the electrochemical reduction of lead peroxide to lead sulfate at the positive plate and oxidation of metallic lead to lead sulfate at the negative plate. During recharging, lead sulfate is re-converted to lead peroxide at the positive plate and to metallic lead at the negative.

To provide active lead peroxide at the positive plate and spongy metallic lead at the negative, pastes of lead oxide mixed with aqueous sulfuric acid are pasted into the positive and negative plates, and the plates subjected to "formation," or electrical charging, to produce lead peroxide by oxidation at the positive plate and metallic lead by reduction at the negative.

Preferably, the lead oxide used in the preparation of both plates is predominantly the red tetragonal form of litharge (PbO), although the plates may be formed of the yellow orthorhombic litharge or of red lead ($Pb_3O_4$), or of any combination of these. Processes for making the lead oxides are well known, and include the Barton process (air oxidation of atomized molten lead to produce predominantly the red litharge), the ball mill process (tumbling pieces or balls of pure lead in an air atmosphere to make a mixture of about 70% red litharge and 30% unoxidized finely divided lead), and the reverberatory furnace process (heating a Barton-type oxide in the presence of air at either 850–1000° F. to make red lead or at 1000–1250° F. to make yellow litharge).

Howsoever made, the lead oxide is formed into a paste by mixing with dilute aqueous sulfuric acid to produce a lead sulfate paste. In practice, lead oxide is added to a mixer, water is then added and the mixture blended to form a rather stiff paste, and dilute sulfuric acid slowly introduced with constant mixing and cooling until the desired paste consistency and density are attained. Typically, the positive paste is made by mixing 50 ml. of water with each pound of oxide for several minutes; 40 ml. of 1.400 specific gravity sulfuric acid is then added over a period of about 10 minutes, and mixing is continued with the addition of more water until the temperature is reduced to 120° F. or less. Negative pastes are formulated similarly, except that an expander is added to inhibit shrinkage of the negative plate during its life and to activate the plates at low temperatures and at high discharge rates. An illustrative expander is composed, per pound of oxide, of 0.2% lignin sulfonic acid, 0.3% blanc fixe, 0.2% carbon black, 50 ml. water, and 40 ml. 1.400 specific gravity sulfuric acid.

The final positive paste density is in the range of about 64–66 grams per cubic inch, and that of the negative paste is about 70 grams per cubic inch.

The pastes are forced into the respective grids, oven dried, and permitted to remain in close contact with each other for several days. They are then ready for formation.

Formation of the plates converts the inactive lead oxide-sulfate paste into the active electrode materials. The unformed plates are placed in a bath of dilute aqueous sulfuric acid (gravity between 1.050 and 1.100), and the positive plates connected to the positive pole of a dc generator and the negative plate to the negative pole. The cells are soaked for about thirty minutes before the generator is turned on. At a current density of about 0.03 ampere per square inch, formation requires about 24 hours. During formation the temperature is advantageously maintained below about 125° F. by cooling of the electrolyte.

After the plates have been formed they are removed from the electrolyte, washed free of acid, and dried either rapidly or in an inert atmosphere to prevent oxidation of the finely divided and highly reactive sponge lead negative plates.

The cells and batteries are then assembled by interweaving the positive and negative plates and inserting the separators between each. When the cells or batteries have been so assembled, the jar tops are sealed in place and a vent, normally provided in the jar top to permit addition of the electrolyte and/or water, is hermetically sealed to prevent access of atmospheric humidity and oxygen, both of which would deleteriously affect the sponge lead and cause premature deactivation of the battery.

CELL AND BATTERY CONSTRUCTION

Cells and batteries incorporating the present invention may be designed and constructed so as to realize any or all of the advantages obtainable from acid loaded polyelectrolyte resins. Thus, in one highly preferred embodiment, the resin is employed as the battery plate separator, in which event it contributes to the excellent operating characteristics of the activated battery as well as affords the advantage of permitting water activation.

Alternatively, or in addition to using the acid-loaded resin as the separator medium, acid loaded polyelectrolyte may be placed elsewhere in, or otherwise in fluid communication with, the cell interior so that its acid content may be leached out to serve as the electrolyte when water is added to the cell. This embodiment is particularly advantageous when exceptionally long shelf storage life is required, as in this event the possibility of sulfuric acid inadvertently and prematurely contacting and discharging the plate is reduced.

As noted earlier, the possibility of inadvertent and premature discharge may be mitigated even where the acid loaded polyelectrolyte constitutes the plate separators. By physically separating the polyelectrolyte separator from the plates, as by the use of acid resistant ribs, woven or nonwoven sheets, or the like, acid may be maintained out of contact with the plates until water is added to the cell.

CELL AND BATTERY ASSEMBLY AND STORAGE

The cells and batteries are assembled in the manner of conventional lead-acid dry charge storage batteries, with but one exception.

Because of the deliquescent nature of the sulfuric acid loaded polyelectrolyte, it is necessary to prevent undue moisture absorption by the loaded polyelectrolyte during assembly and storage. To this end, the loaded polyelectrolyte is advantageously stacked, handled, and assembled in a low-humidity atmosphere. Further, it is also necessary that the cell be hermetically sealed after assembly and during storage and handling so as to avoid moisture absorption. Otherwise, the battery would be subject to premature activation by the moisture.

TESTING PROCEDURES

A series of tests was developed to evaluate the small-size test cells used in the Examples below. These test (except as otherwise indicated) were as follows:

Dry charge retention

An assembled cell, with dry-charged positive and negative plates and a separator of acid-containing polyelectrolyte, was stored in the dry condition in a dessicator at room temperature for a designated time period. In most of the tests below, the time was 19 hours, but in others it was extended to either three days or 30 days. Upon activating the cell by adding a predetermined quantity of distilled water, the cell was discharged across a resistor provided with a recording voltmeter at a rate theoretically capable of completely discharging the cell in five hours (0.09 amp with the plates used in the first few examples). During discharge, cell voltage first drops precipitously and then levels off at a fairly constant voltage until the stored energy is consumed, at which time a rapid drop in voltage indicates the end of the test. To provide reproduceable results, a final voltage of 1.75 volts was selected to represent the end of a test.

The time necessary to reach 1.75 volts divided by five hours (i.e., the theoretical time necessary to discharge the cell completely) thus represents the initial capacity of a dry-charged cell after storage for a predetermined time.

In certain of the tests designated below, the cells were initially discharged at the one hour rate through a flashlight bulb. In other respects, the previously-described procedure was followed.

Life test

In this test the cell was discharged to the 1.75 volt level and recharged overnight, and the cycle repeated until the cell failed. Cells used in the examples were not provided with sediment wells, in contrast to the design of commercial storage batteries, and accordingly failure was generally caused by plate material spalling off, accumulating at the bottom of the cell, and finally short-circuiting the plates.

High-rate discharge

Once during the life test each cell was discharged at the 154-second rate, that is, with a 3-ampere current as contrasted with the 0.09 amp current for the five-hour rate. The time of complete discharge (to 1.75 volts) was determined, and the corresponding cell capacity was computed by dividing the measured time in seconds by 154.

CONTROL CELL

To compare the performance of cells according to the invention with conventional sulfuric acid activated dry charged batteries, a control cell was assembled from commercially available materials but having the dimensions of the test cells used in the examples below.

The positive and negative plates were those used in the commercial Army Signal Corps type BB236U lead-acid storage cells, and were manufactured in the manner described previously. The positive plate and the negative plate were 70 mils thick; both were 1⅜ inches wide and 1 3/16 inches high. The separator was phenolformaldehyde resin impregnated paper (Darak), 1½ inches wide by 1⅜ inches high by 0.052 inch thick, with 0.026 inch embossed ribs (PVC coated) on the positive electrode.

The cell was assembled from one positive and one negative plate and one separator, and the assembly placed within a transparent polymethyl methacrylate container, 1½ inches wide by ¼ inch thick by 1¾ inches deep. The plates and separator rested on the bottom of the cell, with no sediment well to collect spalled plate materials.

The cell was activated by adding 6.1 cc. of 1.285 gravity sulfuric acid (i.e., about 38 weight percent). The cell was immediately discharged at the 5-hour rate for 4 hours, corresponding to 83.3 percent of its nominal storage capacity. The cell was then recharged over a period of 18 hours. Electrolyte specific gravity after full charge was 1.315. The cell was again discharged at the 5-hour rate. The cell delivered for 5.265 hours, corresponding to 105.3% of nominal capacity.

The cell was then cyclicly discharged as described earlier. After 25 cycles the cell delivered 105% of capacity, after 50 cycles 102% and after 75 cycles 60%. By the 98th cycle accumulation of plate material at the bottom of the cell resulted in some current leakage between plates and capacity was reduced to 55%. At the 66th cycle the cell was discharged at the high rate to determine its high rate discharge capacity. At 3 amps the cell discharged for 135 seconds, i.e., it delivered 88% of its capacity.

The results of the foregoing test is the "control" test in Table I below.

Example 1.—In this example, several cells were made and tested employing a separator of porous polyvinyl chloride impregnated with a polyelectrolyte complex and sulfuric acid.

The separators were made by impregnating the pores of a commercial non-woven polyvinyl chloride sheet (Porvic) with acid-containing polyelectrolyte (NaSS-VBTAC). By analysis, the final separator contained 64.2 weight percent sulfuric acid, corresponding to 1.62 grams of sulfuric acid per square inch of separator area. The separator was cut to about 1⅜ inch by 1½ inches, and was approximately 50 mils thick.

The cell was assembled with one positive plate, one separator, and one negative plate. Afterwards the cell was placed in a dessicator for nineteen hours before activation. To activate the cell, 5.1 cc. of water was added.

Five such cells, identified as A through E respectively, were assembled. Cell A was discharged at the 5-hour rate (0.09 amp) for 2.13 hours, corresponding to 42.7% of capacity; after full charge the cell delivered for 4.2 hours or 84% of capacity. On cycling the capacity gradually increased, becoming 91% at 25 cycles and 99% at 75 cycles.

Cells B and C were initially discharged at 0.3 amp, corresponding to approximately the one-hour rate, through a PR6 flashlight bulb rated at 2.5 v. and 0.30 amp. In one typical test the bulb lit brightly within 10 seconds after the battery was activated and remained lit for 71 minutes; it was bright for about 60 minutes. After full charge cell B delivered 106.3% of capacity at the 5-hour rate and cell C delivered 103.6% at the same rate.

The results of cells A through E are set forth as cells A through E of Example 1 on the table below. The initial charge was estimated in each case based on an initial discharge of 0.3 amp, corresponding to the one-hour rate.

Example 2.—This example illustrates the testing of a cell in which the acid-loaded polyelectrolyte was impregnated in porous wool felt.

The cell was made in the same manner as the cells of Example 1, except that the plate separators were 0.040 inch thick wool felt (manufactured by American Felt Company), impregnated with acid-loaded polyelectrolyte resins. The separator contained about 60–70 weight percent sulfuric acid, and the ratio of sulfuric acid (100% basis) to polyelectrolyte resin was about 5:1.

After assembly, the cell was stored in a dessicator for 19 hours and then activated by the addition of 5.1 cc. water.

Thirty minutes after activation the cell was discharged at the 5-hour rate. Capacity was 2.75 hours, or 55% of capacity. After recharging, the cell had an output of 4.846 hours, or 96.9% of nominal capacity, and the acid gravity was 1.283.

Other results of the test are given in Table I below.

Example 3.—This example illustrates the assembly and testing of a water activated dry charge cell using acid loaded polyelectrolyte resin as both the source of sulfuric acid and as the plate separator. The complex was in direct contact with both the positive and negative plates; at present this construction is not regarded as optimum.

The cell was assembled in the manner used for the previous examples, except that the separator consisted of seven layers of acid loaded polyelectrolyte complex. The assembled separator was 1⅜ x 1 9/16" by 49 mils thick, and contained about 60 weight per cent sulfuric acid, in an amount corresponding to about 5 parts by weight of sulfuric acid per part of resin.

The assembled cell was stored for three days in a dessicator. It was activated by adding 5.1 cc. of water.

Initial capacity at the 5-hour rate was 81 minutes (27%), and after recharging was 3.13 hours (62.5%). The liquid electrolyte had a specific gravity, after recharging but before discharging, of 1.184, and after the second cycle additional sulfuric acid was added to raise the specific gravity to 1.283. On the fifth cycle the cell had a capacity of 4.55 hours (91%).

Other test data are reported in Table I below.

Example 4.—This example demonstrates the ability of a water activated dry charged cell to be stored and then activated by the addition of sulfuric acid rather than water.

The cell was assembled in the manner of Example 3, except that the separator consisted of 9, rather than 7, layers of polyelectrolyte complex. The assembled separator was 63 mils thick, and the sulfruic acid content was about 60–70 weight percent concentrated and used in amount corresponding to about 5 parts by weight of sulfuric acid (100%) per part of resin.

The assembled cell was stored dry in a desiccator for 30 days. After this, it was activated by adding 5.1 cc. of 1.285 specific gravity sulfuric acid. Thirty minutes later the cell was discharged at the 5-hour rate, and produced current for 20 minutes, corresponding to 7% of theoretical capacity. The positive plate appeared to be imposing capacity limitations.

After recharging overnight, capacity on 5-hour rate discharge was 5.75 hours, or 115% of capacity. Specific gravity of the re-charged cell electrolyte was 1.380.

TABLE I.—CAPACITY OF CELLS WITH POLYELECTROLYTE SEPARATORS ON LABORATORY CYCLING [1]

| Example | Cell | Acid loaded separator | Sp. gr., Initial | Initial | Capacity at 5 hour rate, percent of nominal vs. cycle No. | | | | | | | High rate (3 a.)[6] | |
|---|---|---|---|---|---|---|---|---|---|---|---|---|---|
| | | | | | 1 | 5 | 10 | 25 | 50 | 75 | 101 | Cycle No. | Sec./percent |
| Control | | (Paper) | 1.315 | 83 | 105 | 115 | 115 | 105 | 102 | 60 [5] | 55 at 98 cyc.[5] | 66 | 135/88 |
| 1 | A | Polyelectrolyte in PVC | 1.234 | 43 | 84 | 92 | 97 | 91 | 99 | 70 | 37 at 94 cyc.[5] | 63 | 109/71 |
| | B | do | 1.287 | Ca. 100 [2] | 106 | 110 | 100 | 71 | 83 | 67 [5] | | 65 | 49/32 |
| | C | do | 1.284 | Ca. 100 [2] | 104 | 107 | 94 | 74 | [4] 85 | 59 [5] | 62 at 97 cyc.[5] | 65 | 105/63 |
| | D | do | 1.202 | Ca. 100 [2] | 94 | 94 | 99 | 79 | 81 | 53 [5] | | | |
| | E | do | 1.210 | Ca. 100 [2] | 92 | 97 | 82 | 93 | 91.6 | 51 at 68 cyc.[5] | | 36 | 72/47 |
| 2 | | Polyelectrolyte, wool felt | 1.282 | 55 | 97 | 117 | 113 | 91 | 95 | 83 | 58 at 98 cyc.[5] | 66 | 134/87 |
| 3 | | Polyelectrolyte | 1.184 | 27 | 63 | 91 | 80 | 72 | 64 | 105 [3] | 61 [5] | 100 | 18/12 |
| 4 | | do | 1.285 | 7 | 115 | 103 | 85 | 88 | 87 | 85 | 55 [5] | | 20/13 |

[1] Gravity of all cells was equalized at 1.260 after second cycle.
[2] Discharged at 0.3 a. initially, which is about the one-hour rate.
[3] Jar leaked at 55 cycles and was replaced; gravity was readjusted.
[4] Jar leaked at 28 cycles and was replaced; gravity was readjusted.
[5] Partial short developed at bottom of cell.
[6] By Peukert's formula $I^{1.38}t = C$, 3 a. is 154 sec. rate for two-plate cell.

Example 5.—The six cells of this example illustrate various alternative geometric configurations of acid-loaded polyelectrolyte separators.

The two positive and three negative plates for each cell were each 1⅞ inch wide by 2⁵⁄₁₆ inch high by 0.068 inch thick, and had been subjected to formation in the manner described previously. Cells Nos. 2, 4, and 5 each had internal dimensions of 2 inches wide by 3½ inches deep by 1³⁄₁₆ inch thick, while cells Nos. 1, 3, and 6 were each 2 inches wide by 3½ inches deep by ⁹⁄₁₆ inch thick.

Cells Nos. 1 and 2 were the control cells, and employed four separators of commercial phenol formaldehyde resin impregnated paper (Darak).

Cell No. 3 employed six separators (four between electrodes and two outside) of sulfuric acid loaded polyelectrolyte resin, cast from an aqueous methanolic sulfuric acid solution.

Cell No. 4 employed four separators of acid loaded polyelectrolyte.

Cell No. 5 used four separators of acid loaded polyelectrolyte. The separator was pressed against a 0.055 inch thick series of polyvinyl chloride strips to provide separator ribs which spaced the separator from the positive plates.

Test conditions differed somewhat from those used in the previous examples, and are indicated along with the test results in Table II below. In other respects the activation and testing procedures were similar.

I claim as my invention:

1. In a lead-acid secondary cell comprising:
   a lead peroxide positive electrode,
   a sponge metallic lead negative electrode, and
   a cell container for the electrodes,
   the improvement whereby said secondary cell is storable and handleable in the dry charged condition and activated by the addition of water thereto, which comprises a polyelectrolyte complex of ionically bonded polycationic and polyanionic organic resins within the cell, which complex contains sulfuric acid at a concentration in excess of a predetermined electrolyte concentration for the secondary cell, said sulfuric acid being non-conducting in the cell and in an amount sufficient to provide an electrolyte of said predetermined concentration upon the addition of a predetermined amount of water to the cell.

2. A water activable dry charged lead-acid storage battery comprising a plurality of the secondary cells of claim 1.

3. The secondary cell of claim 1 wherein said cell container is hermetically sealed during storage and handling and prior to activation.

4. The secondary cell of claim 1 wherein said polyelectrolyte complex is disposed as a separator between the electrodes.

5. The secondary cell of claim 4 wherein said separator consists of said acid-containing polyelectrolyte resin.

TABLE II

| Cell | Material | Separator Ratio, acid polyelectrolyte | Gm. H₂SO₄ per sq. inch | Thickness, mils Web | Thickness, mils PVC ribs | H₂O, ml. | Sp. gr. charged | Capacity at 0.55 a. hrs. v. cycle No. Initial | 1 | 5 | 10 | 25 |
|---|---|---|---|---|---|---|---|---|---|---|---|---|
| 1 | Paper | 0 | 0 | 26 | | (A) | 1.265 | ᴮ 3.17 | | 5.73 | 5.83 | 5.77 |
| 2 | do | 0 | 0 | 26 | | (A) | 1.298 | 4.95 | | 6.37 | 6.30 | 6.10 |
| 3 | Polyelectrolyte | 5/1 | 0.85 | 52 | 0 | 37 | 1.259 | ᴮ 1.03 | | 4.27 | 6.50 | 5.25 |
| 4 | do | 5/1 | 0.68 | 100 | 0 | 30 | 1.285 | 4.78 | 55 | 5.05 | 5.70 | 5.02 |
| 5 | do | 10/1 | | 45 | 55 | 40 | 1.340 | 4.41 | 6.30 | 6.00 | 6.05 | 6.00 |

ᴬ 52 cc. 1.260 gr. H₂SO₄.   ᴮ 0.8 a.

Example 6.—This example illustrates the making and testing of full size automotive storage cells employing acid loaded (i.e., impregnated) polyelectrolyte complex.

Five commercial positive plates and six commercial negative plates, prepared and formed as described previously, were used. The positive plates were 0.069 inch by 5⅜ inches by 5¹¹⁄₁₆ inches, and the negative plates were 0.050 inch by 5⅜ inches by 5¹¹⁄₁₆ inches.

The separators for each of the three cells tested were 0.052 inch by 5⅝ inches by 5²⁷⁄₃₂ inches. For the control cell, i.e., Cell No. 1, the separator was phenol formaldehyde impregnated paper (Darak) provided with embossed PVC-coated ribs to space the separator from the positive plates. For Cell No. 2, separators were cast from a slurry of 5/1H₂SO₄-polyelectrolyte. All cell cases were commercial cases, and provided with integral sediment wells.

The two cells were assembled and then activated by the addition of water and/or acid, as indicated in Table III below. They were then immediately discharged at the 300 ampere rate, corresponding to the discharge rate of an automobile storage battery when starting an automobile engine. Cell No. 1 discharged for 2.87 minutes; Cell No. 2 for 1.66 minutes.

Other test conditions and results are set forth in Table III below.

6. The secondary cell of claim 4 wherein said separator comprises an inert matrix impregnated with said acid-containing polyelectrolyte resin.

7. The secondary cell of claim 6 wherein said inert matrix is wool felt.

8. The secondary cell of claim 6 wherein said inert matrix is an organic resin.

9. The secondary cell of claim 8 wherein said organic resin is polyvinyl chloride.

10. The secondary cell of claim 4 wherein said polyelectrolyte complex separator is spaced apart from said electrodes.

11. The secondary cell of claim 4 including a separator between said electrodes in addition to said polyelectrolyte resin.

12. The secondary cell of claim 1 wherein said polycation contains quaternary ammonium groups.

13. The secondary cell of claim 1 wherein said polyanion contains sulfonate groups.

14. The secondary cell of claim 1 wherein the ratio of polycation to polyanion is within the range of about 1.5:1 to 1:1.5.

15. The secondary cell of claim 1 wherein the weight ratio of sulfuric acid to polyelectrolyte complex is within the range of about 3:1 to 8:1.

TABLE III

| Cell | Material | ratio acid, polyelectrolyte | Gm. H₂-SO₄ sq. inch | Thick, mils | PVC ribs | Activation, Ml. H₂O | Activation, Ml. H₂OS₄ | Sp. gr.* | Capacity at 20 hr. rate, hrs. v. cycle No. 1 | Capacity at 20 hr. rate, hrs. v. cycle No. 10 | Capacity at 20 amp. rate hrs. (cycle No. 5) | Capacity at 300 amp. rate, min. Initial | Capacity at 300 amp. rate, min. Cycle #2 |
|---|---|---|---|---|---|---|---|---|---|---|---|---|---|
| 1 | Paper | | | | 0.026″ | | 690 | 1.272 | 19.2 | 19.55 | 2.38 | 2.87 | 4.02 |
| 2 | Polyelectrolyte, slurry cast | 5/1 | 0.96 | 52 | 0 | 661 | 24 | 1.323 | 19.1 | 17.08 | 1.67 | 1.66 | 3.05 |

*Measured after first charge, following initial discharge and before discharge of cycle No. 1; after second charge, sp. gr. was adjusted to 1,260.

16. A water activable dry charged lead-acid secondary cell comprising:
   a lead peroxide positive electrode,
   a sponge metallic lead negative electrode,
   a cell container for the electrodes, and
   a separator for said electrodes comprising a polyelectrolyte complex of ionically bonded polycationic and polyanionic organic resins containing water-releasable sulfuric acid at a concentration in excess of a predetermined electrolyte concentration for the secondary cell, said sulfuric acid being ionically non-conductive in the cell and in an amount sufficient to provide an electrolyte of said predetermined concentration upon the addition of a predetermined amount of water to the cell.

17. A method of storing and handling a water activable dry charged lead-acid secondary cell having a lead peroxide positive electrode, a sponge metallic lead negative electrode, and a cell container for the electrodes, which method comprises storing and handling said cell in the dry charged condition while maintaining in said cell a polyelectrolyte complex of ionically bonded polycationic and polyanionic organic resins, which complex contains sulfuric acid at a concentration in excess of a predetermined electrolyte concentration for the secondary cell, said amount sufficient to provide an electrolyte of said predetermined concentration upon the addition of a predetermined amount of water to the cell, and thereafter adding water to the cell prior to use thereof to thereby activate the cell.

18. The method of claim 17 wherein said cell container is hermetically sealed during storage and handling.

References Cited

UNITED STATES PATENTS

| 2,117,371 | 5/1938 | Slayter | 136—145 |
| 3,061,662 | 10/1962 | Toce | 136—66 |
| 3,341,366 | 9/1967 | Hodgdon | 136—86 |
| 3,364,072 | 1/1968 | Barber | 136—86 |
| 3,380,857 | 4/1968 | Bilhorn | 136—133 |
| 2,579,589 | 12/1951 | Lehmberg | 136—145 |
| 2,759,036 | 8/1956 | Greenburg et al. | 136—26 |
| 2,866,840 | 12/1958 | Dittmann | 136—26 |
| 2,980,750 | 4/1961 | Mills | 136—146 |
| 3,067,275 | 12/1962 | Solomon | 136—157 |
| 3,258,360 | 6/1966 | Kordesch | 136—26 |
| 3,324,068 | 6/1967 | Michaels | 136—146 |
| 3,328,208 | 6/1967 | Ryhiner | 136—158 |
| 3,419,430 | 12/1968 | Michaels | 136—26 |
| 3,419,431 | 12/1968 | Michaels | 136—26 |

FOREIGN PATENTS

| 663,409 | 5/1963 | Canada | 136—143 |
| 785,848 | 11/1957 | Great Britain | 136—157 |
| 975,695 | 11/1964 | Great Britain | 136—157 |

OTHER REFERENCES

Kirk-Othmer: Encyclopedia of Chemical Technology, vol. XI, pp. 871–73 (2d ed. 1966) Interscience.

WINSTON A. DOUGLAS, Primary Examiner

P. D. ROSENBERG, Assistant Examiner

U.S. Cl. X.R.

136—153